United States Patent [19]

Nash

[11] Patent Number: 5,029,982
[45] Date of Patent: Jul. 9, 1991

[54] LCD CONTRAST ADJUSTMENT SYSTEM

[75] Inventor: Phillip T. Nash, Sunnyvale, Calif.

[73] Assignee: Tandy Corporation, Fort Worth, Tex.

[21] Appl. No.: 405,696

[22] Filed: Sep. 11, 1989

[51] Int. Cl.$^5$ .............................................. G02F 1/13
[52] U.S. Cl. ............................ 350/331 T; 350/339 R; 340/713
[58] Field of Search ........... 350/339 R, 331 T, 331 R; 340/713, 767

[56] References Cited

U.S. PATENT DOCUMENTS

| 3,907,405 | 9/1975 | Fukai et al. | 340/713 |
| 4,525,032 | 6/1985 | Hilsum | 350/331 R |
| 4,723,836 | 2/1988 | Kono et al. | 350/331 R |
| 4,917,469 | 4/1990 | Ross | 350/331 T X |
| 4,923,285 | 5/1990 | Ogiro et al. | 350/331 T |

FOREIGN PATENT DOCUMENTS

| 0267917 | 11/1988 | Japan | 350/331 T |
| 0006927 | 1/1989 | Japan | 350/331 T |

Primary Examiner—Stanley D. Miller
Assistant Examiner—Huy K. Mai
Attorney, Agent, or Firm—Townsend and Townsend

[57] ABSTRACT

A system for maintaining the contrast of an LCD at a constant level despite variations in temperature of the liquid crystal medium includes a temperature sensor and digital circuitry for generating a correction voltage that offsets the change in contrast level caused by the change in operating temperature.

1 Claim, 4 Drawing Sheets

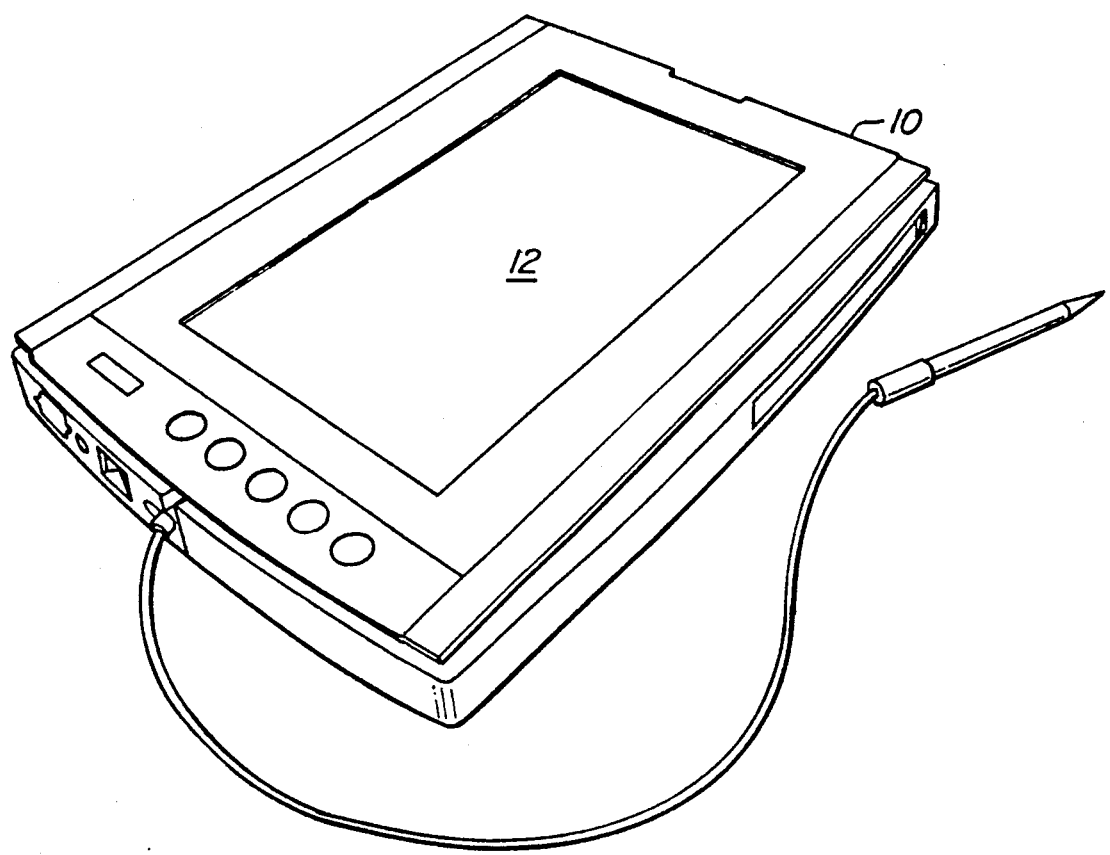
FIG._1.
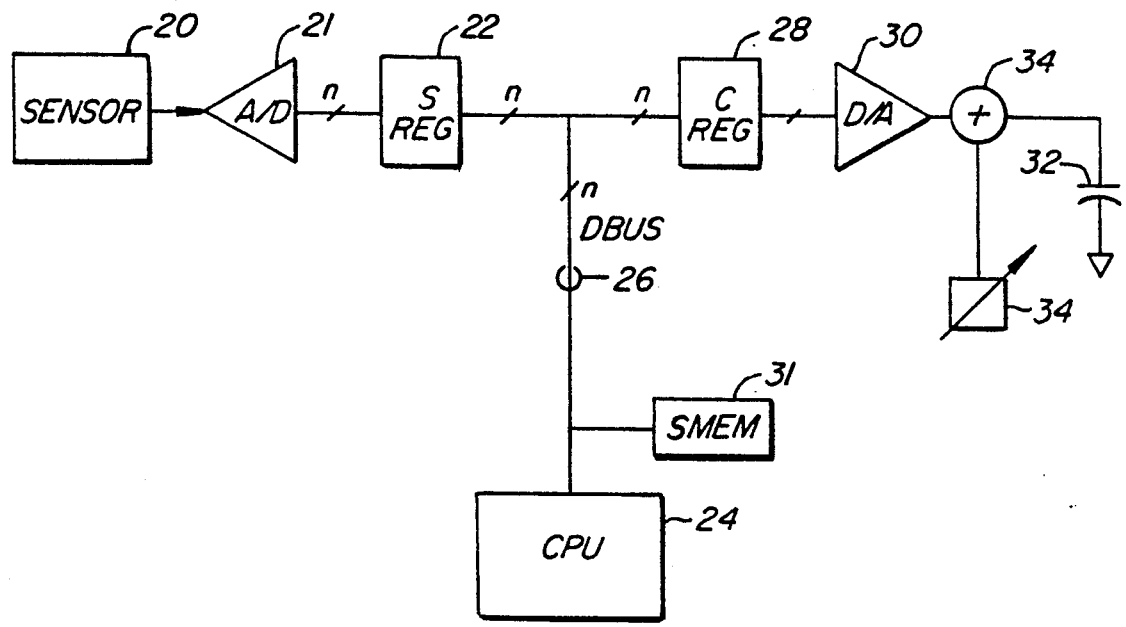
FIG._2.

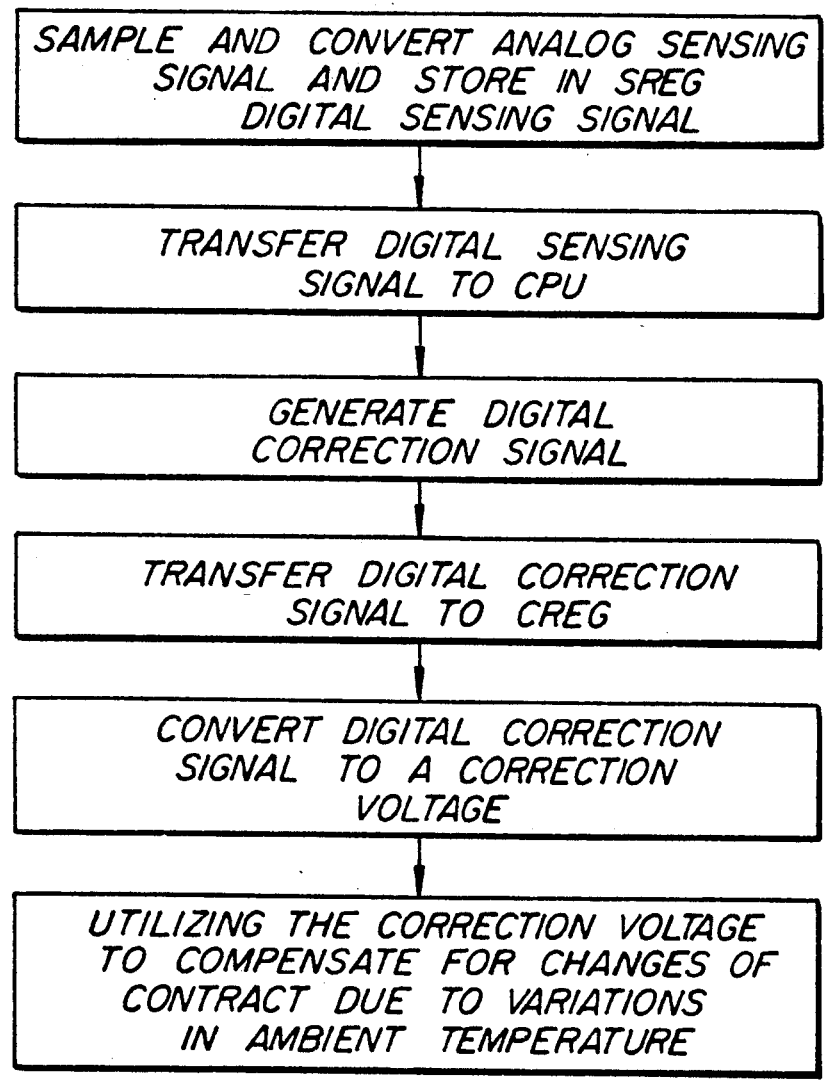
FIG._3.

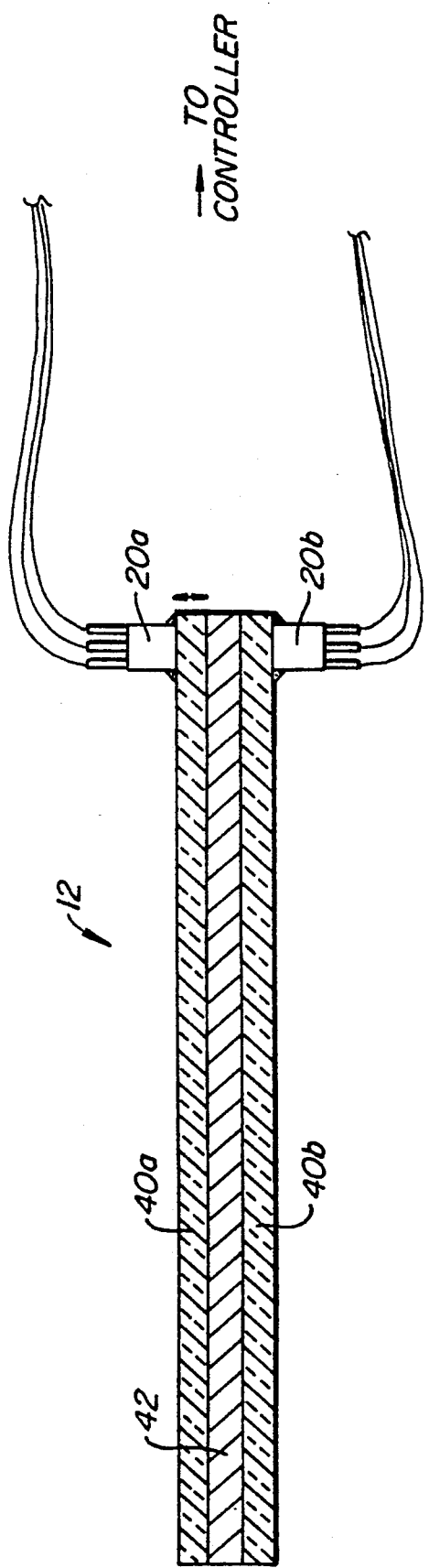
FIG._4.
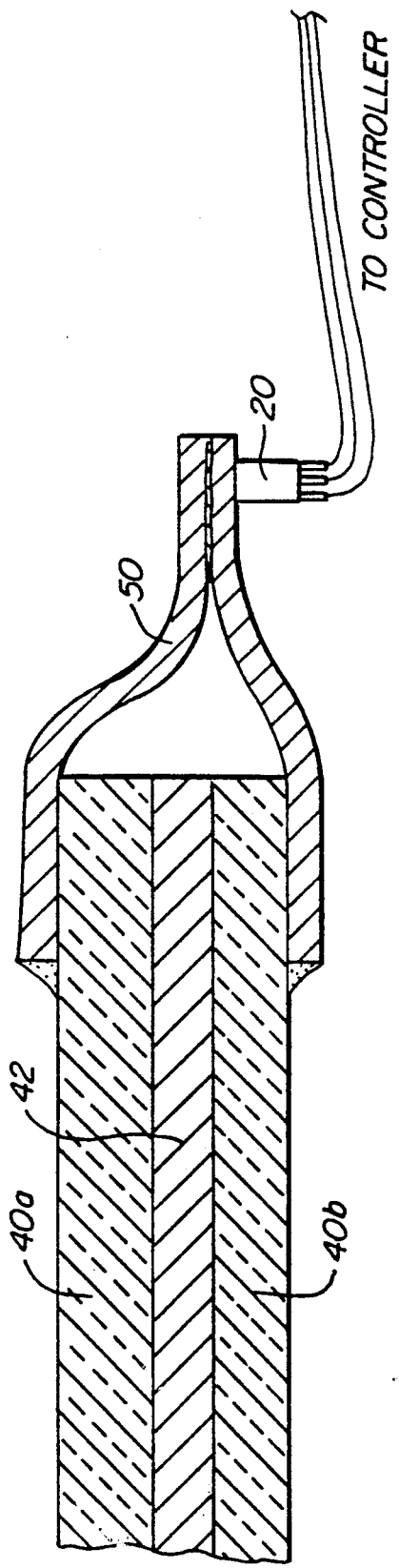
FIG._5.

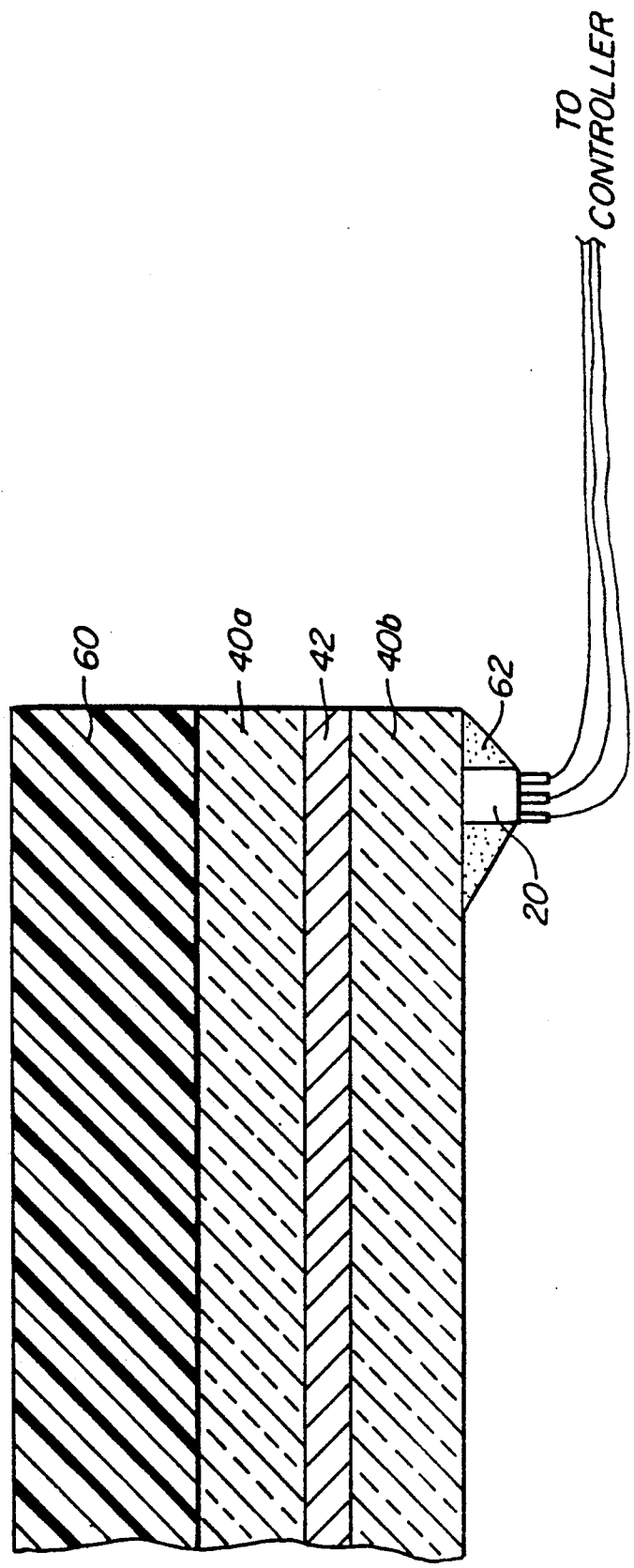

LCD CONTRAST ADJUSTMENT SYSTEM

BACKGROUND OF THE INVENTION

Modern technology has allowed the miniaturization of computers to the extent that portable computers may be used in the field to access, record, and process data.

A critical feature of any computer is the display system. For a portable computer the length of battery life is often critical and the use of a liquid crystal display (LCD) allows the use of a small battery to achieve reasonable battery life. However, LCDs have many drawbacks in that visibility is often limited in extreme lighting conditions and at certain viewing angles.

Additionally, the contrast of the liquid crystal is dependent upon its temperature. At extremely low temperatures the crystal tends to be opaque and at high temperatures it tends to be highly transparent Thus the voltage levels required to create a readable display must be adjusted to account for changes in temperature of the liquid crystal medium.

Thermistor circuits to compensate for heat generated internally by a computer are known. However, portable computers designed for field use will encounter a very wide range of operating temperatures from sub-freezing to summer conditions in vehicles and buildings. Compensation for such extremes is not possible with thermistor circuits.

Thus, there is a great need to improve the visibility of an LCD to provide portable computers having low weight and long battery life.

SUMMARY OF THE INVENTION

The present invention is a system that automatically compensates for variations in the contrast of LCD due to changes of the temperature of the liquid crystal medium due to large variations in the operating temperature of the device utilizing the liquid crystal display.

According to one aspect of the invention, digital data indicating the magnitude of the liquid crystal temperature is processed to determine a contrast correction factor required to maintain the contrast of the LCD at a constant value. This factor is utilized to adjust the contrast of the LCD to compensate for the effects of temperature variation.

This compensation is transparent to the user and provides a display that is maintains a constant desired contrast level despite large changes in operating temperature.

According to a further aspect of the invention, a temperature sensor is coupled to a thermally insulating material enclosing the liquid crystal medium to provide an indication of the temperature of the liquid crystal.

Other features and advantages will become apparent in view of the attached drawings and following detailed description.

BRIEF DESCRIPTION OF THE DRAWINGS

FIG. 1 is a perspective view of a portable hand-held computer having an LCD display;

FIG. 2 is block diagram of a preferred embodiment of the invention;

FIG. 3 is a flow chart illustrating the operation of the embodiment of FIG. 2; and FIGS. 4–6 are schematic diagrams depicting various configurations for coupling a thermal sensor to the LCD.

DETAILED DESCRIPTION OF THE PREFERRED EMBODIMENTS

A perspective view of a hand-held computer 10 including an LCD 12 is depicted in FIG. 1. It is intended that the computer be suitable for use in the field where the operating temperature may vary significantly when, for example, the user goes from a heated room to the outdoors in winter.

FIG. 2 is a block diagram of an embodiment of the invention. A temperature sensor 20 outputs an analog sensing signal having a magnitude that varies as a known function of the temperature of the liquid crystal medium. As described below, the sensing device 20 must be thermally coupled to the liquid crystal screen in such a way that the thermal response nearly matches the temperature of the liquid crystal medium.

This analog sensing signal is converted to a digital sensing signal by an analog to digital convertor (ADC) 21 which is periodically sampled an stored in an SRegister 22. The SRegister output is coupled to the data input of a CPU 24 by a DBUS 26. The input of a CRegister 28 is coupled to the CPU 24 by the DBUS 26. The output of the CRegister 28 is coupled to the input of a digital to analog convertor (DAC) 30. Additionally, a system memory 31 is coupled to the CPU 24 by the DBUS 26.

The LCD 12 is represented by a capacitor 32. The upper plate of the capacitor is coupled to a voltage adder 34 having as its inputs the output to the DAC 30 and variable power supply 34. The variable power supply 34 allows a user to adjust the contrast of the LCD 12 to a desired level.

FIG. 3 is flow chart illustrating the steps of a temperature compensation program stored in the system memory 31. The operation of the system of FIG. 2 will now be described with reference to FIGS. 2 and 3.

The contrast of the LCD 12 depends on the voltage difference impressed to the plates of the capacitor 32 and the magnitude of the temperature of the temperature of the liquid crystal medium in the LCD 12. The dependence of the contrast of a particular LCD on temperature and the magnitudes of the correction voltage required to correct this dependence is determined empirically and expressed in the form of either as a mathematical function or a table of stored values. The program utilizes the value of the digital sensing signal read from the SRegister 22 to generate the digital correction signal. If a mathematical function is utilized the value of the digital correction signal is calculated utilizing the ALU of the CPU. If a table is utilized the CPU utilizes the digital sensing signal as an address to access the digital correction signal from a look up table stored in the system memory 31.

After the value of the digital correction signal is determined, the signal is transferred to the CRegister 28. This digital correction signal is then converted to an analog correction voltage signal by the DAC 30 and added to the variable power supply voltage by the voltage adder 34.

FIGS. 4, 5, and 6 depict configurations for thermally coupling the sensor 20 so that its thermal response nearly matches the temperature of the LCD panel 12.

Referring to FIG. 4, the LCD panel 12 includes front and back glass plates 40a and b enclosing the liquid crystal medium 42. Two sensors 20a and b may be coupled to the different plates 40a and b to compensate for the thermally insulating property of the glass. Due to heat generated by operating the computer, the computer side of the display 12 is nearly always warmer than the outside air. By using two sensors 20a and b and averaging the an output closely matching the temperature of the liquid crystal medium 42 is obtained. If the thermal properties of the two plates are different a weighted average may be calculated to compensate for the difference.

In FIG. 5 the a single sensor 20 may be thermally coupled to plates 40a and b by a heat conductive element 50 thermally coupled to the plates 40a and b and the sensor 20. The heat conductive element 50 may be designed to compensate for variations in the thermal properties of the plates 40a and b to obtain an accurate representation of the liquid crystal temperature.

In FIG. 6 a thick, thermally insulating touch screen overlay 60 separates the upper plate 40a from the outside temperature. Thus, the temperature of the liquid crystal medium 42 is closely approximated by the temperature of the lower plate 40b. A single sensor 20 is thermally coupled to the lower plate 40b and insulated from the temperature inside the computer by an RTV-1 like material of a thickness having a thermal length that approximates the property of the lower plate 40b. Alternatively, the sensor may measure the inside temperature of the computer as a rough approximation of the temperature of the liquid crystal medium 42.

The user adjusts the variable power supply to achieve the initial desired contrast. The temperature correction system then provides the required voltage to offset changes in contrast due to temperature variations so that the contrast level of the display remains as set by the user.

The invention has now been described with reference to a preferred embodiment. Variations and substitutions will now be apparent to persons of ordinary skill in the art. Accordingly, it is not intended that the invention be limited except as provided by the appended claims.

What is claimed is:

1. In a portable computer having an interior part and including a liquid crystal display of the type having a liquid crystal medium enclosed in first and second plates, with the first plate forming the outside of the computer and separating the liquid crystal medium from the exterior environment and being of sufficient thickness to isolate the liquid crystal medium from the exterior temperature and the second plate separating the liquid crystal medium from the interior of the computer and being thinner than the first plate so that the temperature of the liquid crystal medium is determined by the temperature of the interior of the computer, with the second plate characterized by a predetermined thermal length, a system for maintaining the contrast of the liquid medium at a constant level over a large range of operating temperatures, said system comprising:

a sensor coupled to the second plate for generating an indication of the magnitude of the temperature sensed by said sensor;

insulating means, having a thermal length substantially equal to the predetermined thermal length of said second plate, separating said sensor from the interior of the computer so that temperature of the interior of the computer is coupled to the sensor through said predetermined thermal length to approximate the temperature of said liquid crystal medium;

means, responsive to said indication, for generating a contrast correction signal having a magnitude dependent on the indicated magnitude of the temperature sensed by the sensor; and means, coupled to receive said contrast correction signal, for adjusting the contrast of the liquid crystal display according to the magnitude of the contrast correction signal.

* * * * *